(12) United States Patent
Koketsu et al.

(10) Patent No.: US 9,517,969 B2
(45) Date of Patent: Dec. 13, 2016

(54) METHOD FOR MANUFACTURING A POROUS GLASS FILM

(71) Applicant: CANON KABUSHIKI KAISHA, Tokyo (JP)

(72) Inventors: Naoyuki Koketsu, Tokyo (JP); Zuyi Zhang, Yokohama (JP); Yoshinori Kotani, Yokohama (JP); Akiko Takei, Fujisawa (JP); Akira Sugiyama, Yokohama (JP); Kenji Takashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/358,850

(22) PCT Filed: Oct. 18, 2012

(86) PCT No.: PCT/JP2012/006673
§ 371 (c)(1),
(2) Date: May 16, 2014

(87) PCT Pub. No.: WO2013/073106
PCT Pub. Date: May 23, 2013

(65) Prior Publication Data
US 2014/0305166 A1 Oct. 16, 2014

(30) Foreign Application Priority Data
Nov. 18, 2011 (JP) ................. 2011-253069

(51) Int. Cl.
*C03C 11/00* (2006.01)
*C03C 17/00* (2006.01)
*G02B 5/30* (2006.01)

(52) U.S. Cl.
CPC ........... *C03C 11/005* (2013.01); *C03C 17/006* (2013.01); *G02B 5/3008* (2013.01); *C03C 2217/425* (2013.01)

(58) Field of Classification Search
CPC . C03C 17/006; C03C 11/005; C03C 2217/425
See application file for complete search history.

(56) References Cited

U.S. PATENT DOCUMENTS

| 4,080,188 A | 3/1978 | Doddato |
| 4,086,074 A * | 4/1978 | Minot ............... C03C 15/00 65/111 |

(Continued)

FOREIGN PATENT DOCUMENTS

| DE | 3820547 A1 | 12/1988 |
| EP | 130801 A1 | 1/1985 |

(Continued)

OTHER PUBLICATIONS

Tengzelius Rohe V et al., "Development of Porous Antireflective Films on Soda-Lime-Silica Glass", Journal of the American Ceramic Society, Feb. 1984, pp. 142-146, vol. 67, No. 2, Columbus, Ohio, USA.

(Continued)

*Primary Examiner* — Queenie Dehghan
(74) *Attorney, Agent, or Firm* — Canon USA, Inc. I.P. Division

(57) ABSTRACT

The present invention provides an optical member having a high transmittance, wherein a composition change of a phase-separable base material glass film is suppressed.
A method for manufacturing an optical member provided with a porous glass film on the base member includes the steps of forming a glass powder film containing a glass powder on the base member, forming a phase-separable base material glass film on the base member by heating and fusing the glass powder film in an atmosphere having an oxygen concentration of more than 20%, forming a phase-separated glass film on the base member by heating the base (Continued)

material glass film, and forming a porous glass film on the base member by subjecting the phase-separated glass film to an etching treatment.

3 Claims, 6 Drawing Sheets

(56) References Cited

U.S. PATENT DOCUMENTS

| | | | |
|---|---|---|---|
| 4,273,826 A | | 6/1981 | McCollister |
| 4,313,748 A | | 2/1982 | Macedo et al. |
| 4,778,777 A | | 10/1988 | Eguchi et al. |
| 5,516,350 A | * | 5/1996 | Onoda et al. ............ 65/17.2 |
| 7,132,374 B2 | | 11/2006 | Mak et al. |
| 2004/0096672 A1 | | 5/2004 | Lukas et al. |
| 2005/0146730 A1 | * | 7/2005 | Endo et al. ............ 356/512 |
| 2007/0063453 A1 | * | 3/2007 | Ishikawa et al. ........ 279/3 |
| 2011/0042301 A1 | | 2/2011 | Zhang et al. |

FOREIGN PATENT DOCUMENTS

| | | |
|---|---|---|
| EP | 0721112 A2 | 7/1996 |
| JP | S56-092138 A | 7/1981 |
| JP | 64083583 A | 3/1989 |
| JP | H01-192775 A | 8/1989 |
| JP | H03-115139 A | 5/1991 |
| JP | 2002160941 A | 6/2002 |
| JP | 2006193341 A | 7/2006 |
| WO | 00/13768 A1 | 3/2000 |

OTHER PUBLICATIONS

Mukherjee, S.P., "Gel-derived single-layer antireflection films with a refractive index gradient", Thin Solid Films, (1981), pp. L89-L90.
Minot et al., "Single-layer, gradient refractive index antireflection films effective from 0.35 to 2.5 [mu]", Optical Society of America, Jun. 1976, pp. 515-519, vol. 66, No. 6.
Sumio Sakka and two other members, "Garasu Handobukku (Glass Handbook)", Asakura Publishing Co., Ltd., Sep. 30, 1975, p. 334-335 (English translation included herewith).

* cited by examiner

METHOD FOR MANUFACTURING A POROUS GLASS FILM

TECHNICAL FIELD

The present invention relates to a method for manufacturing an optical member provided with a porous glass film on a base member and a method for manufacturing an image pickup apparatus provided with the optical member.

BACKGROUND ART

In recent years, the industrial utilization of porous glasses as adsorbing agents, microcarrier supports, separation films, optical materials, and the like has been highly anticipated. In particular, porous glasses have a wide utilization range as optical members because of a characteristic of low refractive index.

As for a method for manufacturing a porous glass relatively easily, a method taking advantage of a phase separation phenomenon has been mentioned. A typical example of a base material for the porous glass exhibiting the phase separation phenomenon is borosilicate glass made from silicon oxide, boron oxide, an alkali metal oxide, and the like. In production, the phase separation phenomenon is induced by a heat treatment in which a molded borosilicate glass is held at a constant temperature (hereafter referred to as a phase separation heat treatment), and a non-silicon oxide rich phase, which is a soluble component, is eluted through etching with an acid solution. The skeleton constituting the thus produced porous glass is primarily silicon oxide. The skeleton diameter, the hole diameter, and the porosity of the porous glass are affected by the composition before the phase separation heat treatment is performed and the temperature and time of the phase separation heat treatment significantly. The skeleton diameter, the hole diameter, and the porosity have influences on the reflectance and the refractive index of the light.

PTL 1 discloses a method for forming a porous glass film on a base member. Specifically, a phase-separable base material glass film is formed on the base member by applying and fusing a film including phase-separable borosilicate glass particles on the base member, and the porous glass film is formed on the base member by a phase separation heat treatment and an etching treatment.

In order to utilize a porous glass as an optical material, it is required that no bubbles causing scattering of light are included. In a known method for removing bubbles, glass is heated at a high temperature of 1,350 degrees (celsius) to 1,500 degrees (celsius), as described in NPL 1.

CITATION LIST

Patent Literature

PTL 1: Japanese Patent Laid-Open No. 01-192775

Non Patent Literature

NPL 1: Sumio Sakka and two other members, "Garasu Handobukku (Glass Handbook)", Asakura Publishing Co., Ltd., Sep. 30 (1975), p. 334-335

SUMMARY OF INVENTION

Technical Problem

The method in which a porous glass film is formed on a base material, as disclosed in PTL 1, is not used for the above-described heat treatment at a high temperature because of the limitation of the heat-resistance temperature of the base member. Boron and sodium components contained in the borosilicate glass particles are volatilized by the above-described heat treatment at a high temperature, and the composition is changed in such a way that phase separation does not occur. In addition, the softening point of the surface is increased by volatilization of the boron and sodium components, so that fusion between borosilicate glass particles may be suppressed. Consequently, gaps are generated between borosilicate glass particles easily, the amount of generation of bubbles in the porous glass film increases, so as to cause an occurrence of scattering of the light and a reduction in transmittance.

The present invention provides a method for manufacturing an optical member having high transmittance simply, wherein composition change of a phase-separable base material glass film is suppressed.

Solution to Problem

A method for manufacturing an optical member provided with a porous glass film on a base member, according to an aspect of the present invention, includes the steps of forming a glass powder film containing a glass powder on the base member, forming a phase-separable base material glass film on the above-described base member by heating and fusing the above-described glass powder film in an atmosphere having an oxygen concentration of more than 20%, forming a phase-separated glass film on the above-described base member by heating the above-described base material glass film, and forming a porous glass film on the above-described base member by subjecting the above-described phase-separated glass film to an etching treatment.

Advantageous Effects of Invention

According to an aspect of the present invention, a method for manufacturing an optical member having high transmittance simply is provided, wherein composition change of a phase-separable base material glass film is suppressed.

DESCRIPTION OF EMBODIMENTS

Figure 1:
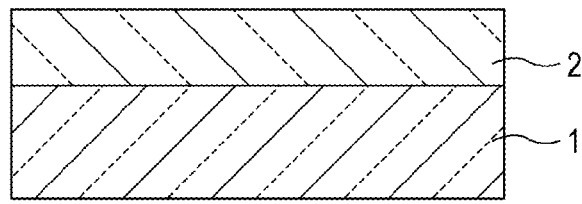
FIG. 1 is a schematic sectional view showing an example of an optical member according to an aspect of the present invention.

The embodiments according to the present invention will be described below in detail. In this regard, well known or publicly known technologies in the related art are adopted for the portions not specifically shown in the drawings and the descriptions in the present specification.

Optical Member

FIG. 1 shows a schematic sectional view of an optical member according to an aspect of the present invention. The optical member according to an aspect of the present invention is provided with a porous glass film 2 having a porous structure including continuous holes derived from spinodal type phase separation on a base member 1. The porous glass film 2 is a low-refractive index film and is expected to be utilized as an optical member because reflection at the interface between the porous glass film 2 and the air is suppressed.

The term "phase separation" will be described with reference to an example in which borosilicate glass containing silicon oxide, boron oxide, and an oxide having an alkali metal is used as a glass body. The term "phase separation" refers to separation of a phase with a composition of the oxide having an alkali metal and the boron oxide larger than the composition before the phase separation occurs (non-silicon oxide rich phase) from a phase with a composition of the oxide having an alkali metal and the boron oxide smaller than the composition before the phase separation occurs (silicon oxide rich phase) in the inside of glass, where the structures are on a scale of several nanometers. The phase-separated glass is subjected to an acid treatment to remove the non-silicon oxide rich phase, so that a porous structure is formed in the glass body.

The phase separation is classified into a spinodal type and a binodal type. A hole of the porous glass obtained by spinodal type phase separation is a through hole connected from the surface to the inside. More specifically, the structure derived from the spinodal type phase separation is an "ant nest"-shaped structure in which holes are three-dimensionally connected. The skeleton made from silicon oxide can be regarded as a "nest" and a through hole can be regarded as a "burrow". Meanwhile, a porous glass obtained by binodal type phase separation has a structure in which independent holes, each surrounded by a closed curved surface substantially in the shape of a sphere, are present in the skeleton made from silicon oxide discontinuously. The hole derived from spinodal type phase separation and the hole derived from binodal type phase separation are determined and distinguished on the basis of the result of observation of their shapes by using an electron microscope. In addition, the spinodal type phase separation and the binodal type phase separation are specified by controlling the composition of the glass body and the temperature in phase separation.

The thickness of the porous glass film 2 is not specifically limited, and is preferably 200 nm or more and 50.0 micrometers or less, and more preferably 300 nm or more and 20.0 micrometers or less.

As for the thickness of the porous glass film 2, specifically, a scanning electron microscope (FE-SEM S-4800, produced by Hitachi, Ltd.) is used and a SEM image (electron micrograph) at an acceleration voltage of 5.0 kV is taken. The thickness of the glass film portion on the base member of the taken image is measured at 30 or more points and the average value thereof is used.

The porosity of the porous glass film 2 is not specifically limited and is preferably 30% or more and 70% or less, and more preferably 40% or more and 60% or less. If the porosity is less than 30%, the advantages of porosity are not fully utilized. If the porosity is more than 70%, the surface strength tends to be reduced unfavorably.

Figure 2:
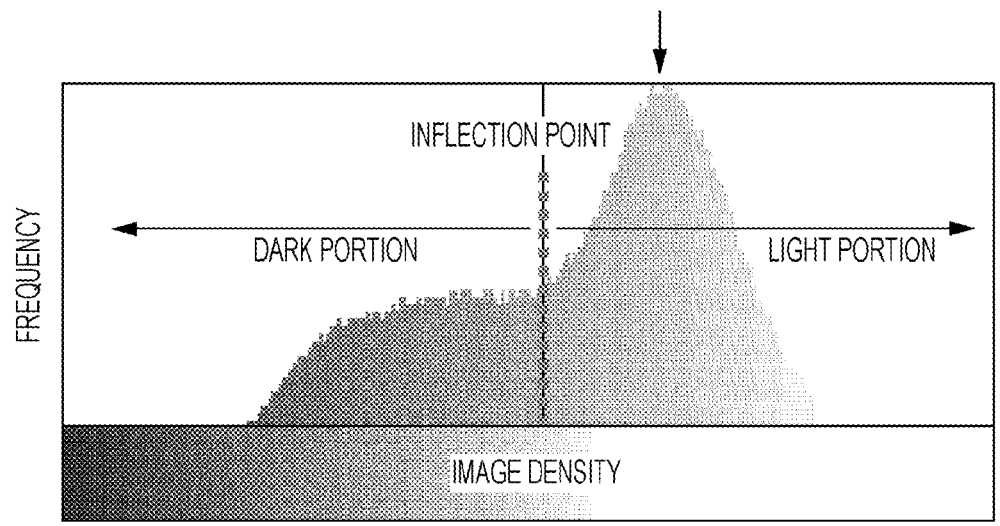
FIG. 2 is a diagram illustrating a porosity.

The porosity is measured as described below. The electron microscopy image is binarized into a skeleton portion and a hole portion. Specifically, a scanning electron microscope (FE-SEM S-4800, produced by Hitachi, Ltd.) is used and the porous glass is subjected to surface observation at an acceleration voltage of 5.0 kV at a magnification of 100,000× (50,000× in some cases), where shading of the skeleton is observed easily. The observed image is stored as an image, and the SEM image is made into a graphical form on the basis of the frequency of image density by using image analysis software. FIG. 2 is a diagram showing the frequency on the basis of the image density of a spinodal type porous glass. In FIG. 2, the peak portion indicated by an arrow in the downward direction of the image density corresponds to the skeleton portion located at the front. The light portion (skeleton portion) and the dark potion (hole portion) are binarized into white and black, where an inflection point near the peak position is taken as a threshold value. An average value of the ratios of the area of dark portion to the area of total portion (sum of areas of white and black portions) of the whole image is determined and is taken as the porosity.

In many cases of porous glass film 2, in general, a large porosity in a local region is equivalent to a large hole diameter or a small proportion of skeleton. Therefore, in the portion having a large porosity, the hole diameter is large or the skeleton diameter is small.

The average hole diameter of the porous glass film 2 is preferably 1 nm or more and 200 nm or less, and more preferably 5 nm or more and 100 nm or less. If the average hole diameter is less than 1 nm, the characteristics of the porous structure are not fully utilized. If the average hole diameter is more than 100 nm, the surface strength tends to be reduced unfavorably. In this regard, the average hole diameter can be smaller than the thickness of the porous glass film.

Figure 3A:
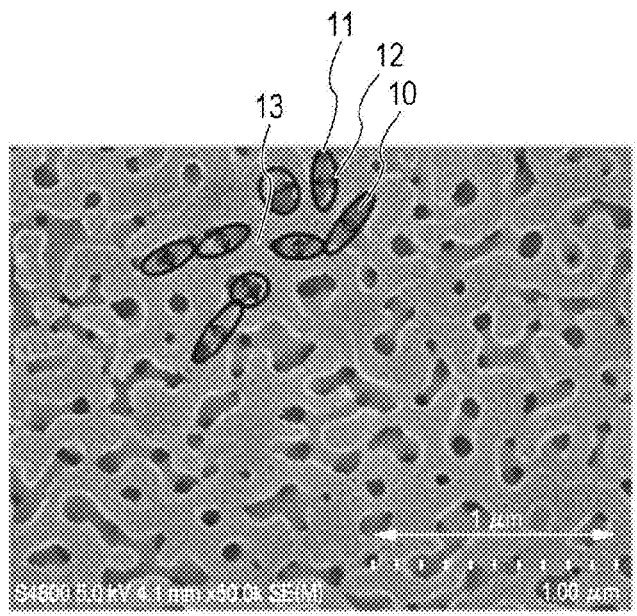
FIG. 3A is a diagram illustrating an average hole diameter.

The average hole diameter in the present invention is defined as an average value of the minor axes of a plurality of approximated ellipses, where holes in the porous body surface are approximated by the plurality of ellipses. Specifically, for example, as shown in FIG. 3A, an electron micrograph of the porous body surface is used, holes 10 are approximated by a plurality of ellipses 11, an average value of the minor axes 12 of the individual ellipses is determined and, thereby, the average hole diameter is obtained. At least 30 points are measured and an average value thereof is determined.

The average skeleton diameter of the porous glass film 2 is preferably 1 nm or more and 50 nm or less. If the average skeleton diameter is more than 50 nm, the light is scattered considerably, and the transmittance is reduced significantly. If the average skeleton diameter is less than 1 nm, the strength of the porous glass film 2 tends to become small.

Figure 3B:
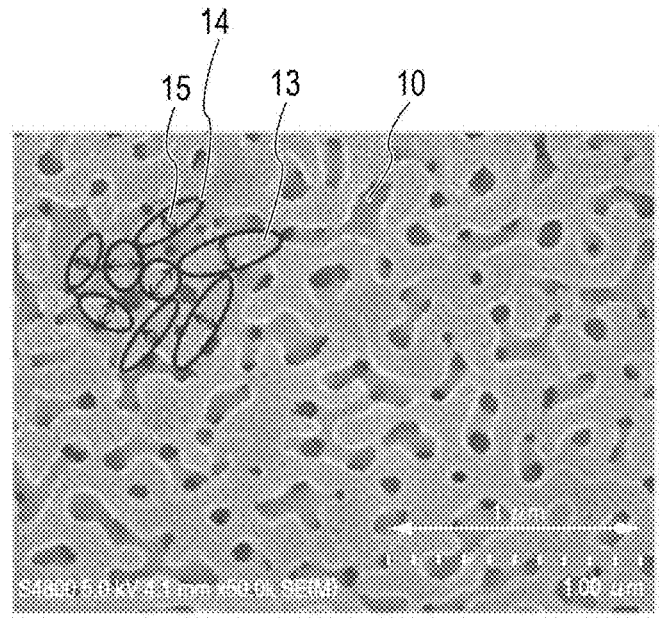
FIG. 3B is a diagram illustrating an average skeleton diameter.

The average skeleton diameter in the present invention is defined as an average value of the minor axes of a plurality of approximated ellipses, where the skeleton of the porous body surface is approximated by the plurality of ellipses. Specifically, for example, as shown in FIG. 3B, an electron micrograph of the porous body surface is used, the skeleton 13 is approximated by a plurality of ellipses 14, an average value of the minor axes 15 of the individual ellipses is determined and, thereby, the average skeleton diameter is obtained. At least 30 points are measured and an average value thereof is determined.

The hole diameter and the skeleton diameter of the porous glass film 2 may be controlled by the material serving as a raw material and the heat treatment condition in spinodal type phase separation.

Specifically, the optical members according to aspects of the present invention may be used for optical members, e.g., polarizers used in various displays of televisions, computers, and the like and liquid crystal display apparatuses, finder lenses for cameras, prisms, fly-eye lenses, and toric lenses. The optical members may be further used for various lenses of image taking optical systems, observation optical systems, e.g., binoculars, projection optical systems used for liquid crystal projectors and the like, and scanning optical systems used for laser beam printers and the like, in which porous glasses are used.

Figure 10:
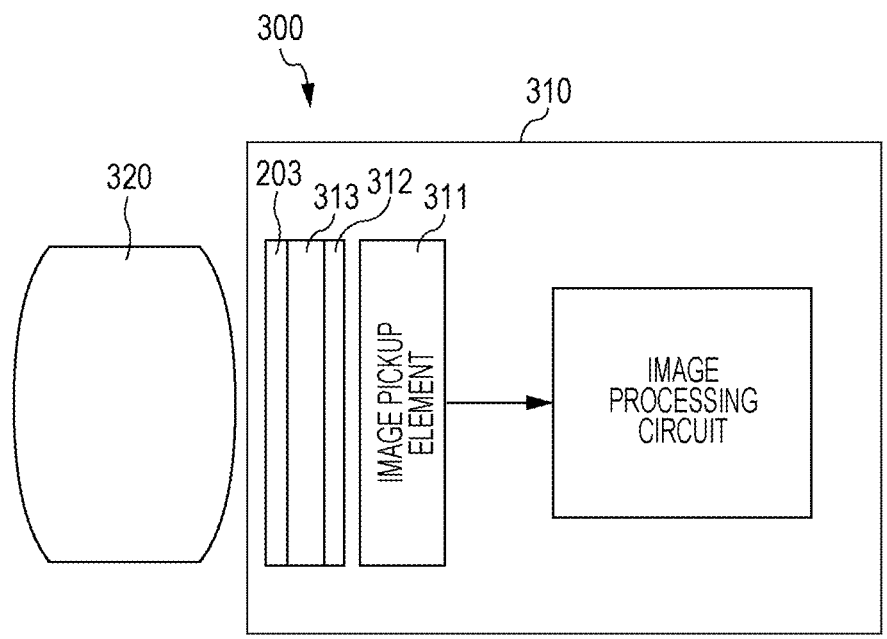
FIG. 10 is a schematic diagram showing an image pickup apparatus according to an aspect of the present invention.

The optical members according to aspects of the present invention may be mounted on image pickup apparatuses, e.g., digital cameras and digital video cameras. FIG. 10 is a schematic sectional diagram showing a camera (image pickup apparatus) that uses an optical member 203 according to an embodiment of the present invention, specifically, an image pickup apparatus that forms a subject image from a lens onto an image pickup element through an optical filter. An image pickup apparatus 300 includes a main body 310 and a detachable lens 320. The image pickup apparatus, e.g., a digital single-lens reflex camera, obtains imaging screens at various field angles by changing an imaging lens to be used for photographing to a lens having a different focal length. The main body 310 includes an image pickup element 311, an infrared-cut filter 312, a low-pass filter 313, and the optical member 203 according to an aspect of the present invention. The optical member 203 includes the base member 1 and the porous glass film 2, as shown in FIG. 1.

The optical member 203 and the low-pass filter 313 may be formed integrally or be formed independently. The optical member 203 may be configured to also serve as a low-pass filter. That is, the base member 1 of the optical member 203 may be the low-pass filter.

The image pickup element 311 is held in a package (not shown in the drawing) and this package keeps the image pickup element 311 in a hermetically sealed state with a cover glass (not shown in the drawing). A sealing member, e.g., a double-sided tape, seals between the optical filters, e.g., the low-pass filter 313 and the infrared-cut filter 312, and the cover glass (not shown in the drawing). An example in which both the low-pass filter 313 and the infrared-cut filter 312 are provided will be described, although any one of them may be provided alone.

The porous glass film 2 of the optical member 203 according to an aspect of the present invention has a spinodal type porous structure and, therefore, is excellent in terms of dustproof performance, e.g., suppression of dust adhesion. Consequently, the optical member 203 is disposed in such a way as to be located on the side opposite to the image pickup element 311 of the optical filter. The optical member can be disposed in such a way that the porous glass film 2 is located farther from the image pickup element 311 than the base member 1 is. Put another way, the optical member 203 can be disposed in such a way that the base member 1 and the porous glass film 2 are disposed in that order from the image pickup element 311 side.

Method for Manufacturing Optical Member

The optical member according to an aspect of the present invention is configured to include a porous glass film on a base member and is formed as described below. A glass powder film containing a glass powder is formed on the base member, the glass powder film is heated and fused in an atmosphere having an oxygen concentration of more than 20% so as to be converted to a base material glass film, and the base material glass film is subjected to a phase separation treatment and an etching treatment, so that a porous glass film is formed on the base member.

The step of heating and fusing the glass powder film is performed in an atmosphere having an oxygen concentration of more than 20% and, thereby, vaporization of boron and sodium components contained in the glass powder is suppressed, so that a phase-separable base material glass film, in which composition change is reduced, is formed. In addition, the phase-separable base material glass film including reduced bubbles is formed under this condition. The number of bubbles remaining in the porous glass film formed through phase separation and etching is reduced and, thereby, reduction in transmittance is suppressed. Although this mechanism is not certain, a hypothesis will be described later.

Next, each step in the method for manufacturing an optical member according to an aspect of the present invention will be described below in detail with reference to FIGS. 4A to 4D.

Step of Forming Glass Powder Film

Figure 4A:
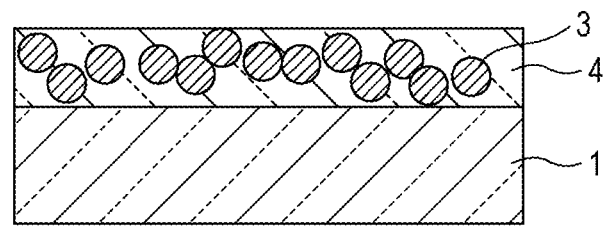
FIG. 4A is a schematic sectional view illustrating an example of a method for manufacturing an optical member according to an aspect of the present invention.

As shown in FIG. 4A, a glass powder film 4 containing a glass powder 3 is formed on the base member 1.

In the present invention, it is necessary that a hole structure derived from spinodal type phase separation be formed in the porous glass film 2 on the base member 1. For this purpose, careful composition control of glass is desired and a method in which, after a glass composition has been established, a phase-separable glass powder 3 is produced, the resulting glass powder 3 is applied to the base member 1, and a film is formed by fusion can be employed.

The phase separation property refers to a property that phase separation is induced by a heat treatment. Examples of phase-separable glass include silicon oxide based glass I (silicon oxide-boron oxide-alkali metal oxide), silicon oxide based glass II (silicon oxide-boron oxide-alkali metal oxide-(alkaline-earth metal oxide, zinc oxide, aluminum oxide, zirconium oxide)), and titanium oxide glass (silicon oxide-boron oxide-calcium oxide-magnesium oxide-aluminum oxide-titanium oxide). Among them, borosilicate based glass composed of silicon oxide-boron oxide-alkali metal oxide can be employed. In particular, the borosilicate based glass having a composition in which the proportion of silicon oxide is 55.0 percent by weight or more and 95.0 percent by weight or less, and especially 60.0 percent by weight or more and 85.0 percent by weight or less can be employed. In the case where the proportion of silicon oxide is in the above-described range, phase-separated glass having high skeletal strength tends to be obtained easily and, therefore, is useful in applications where strength is required. The molar ratio of boron to alkali components is preferably 0.25 or more and 0.4 or less. If the ratio is out of this range, breakage of the film may occur because of expansion and shrinkage during etching.

As for a method for manufacturing base glass serving as a phase-separable glass powder 3, the base glass may be produced by a known method except that a raw material is prepared to have the composition of the above-described phase-separable glass. For example, production may be performed by heating and fusing the raw material containing supply sources of the individual components and, as necessary, by molding the raw material into a predetermined form. In the case where heating and fusing are performed, the heating temperature may be set appropriately in accordance with the raw material composition and the like, and usually heating and fusing may be performed within the range of 1,350 degrees (celsius) to 1,500 degrees (celsius).

The glass powder 3 is produced by pulverizing the base glass. The pulverizing method is not specifically limited and a known pulverizing method may be used. Examples of pulverizing methods include liquid phase pulverizing methods using a bead mill and vapor phase pulverizing methods using a jet mill.

Examples of methods for manufacturing the glass powder film 4 include a printing method, a spin coating method, and a dip coating method. Explanations will be made below with reference to a method by using a common screen printing method as an example. In the screen printing method, the glass powder 3 is made into a paste and is printed by using a screen printing machine. Therefore, adjustment of the paste is necessary. The paste contains a thermoplastic resin, a plasticizer, a solvent, and the like in addition to the above-described glass powder 3.

It is desirable that the proportion of the glass powder 3 contained in the paste be within the range of 30.0 percent by weight or more and 90.0 percent by weight or less, and preferably 35.0 percent by weight or more and 70.0 percent by weight or less.

The thermoplastic resin contained in the paste is a component that enhances the film strength after drying and imparts flexibility. As for the thermoplastic resin, polybutyl methacrylate, polyvinyl butyral, polymethyl methacrylate, polyethyl methacrylate, ethyl cellulose, and the like may be used. These thermoplastic resins may be used alone or in combination. The content of the thermoplastic resin contained in the paste is preferably 0.1 percent by weight or more and 30.0 percent by weight or less. If the content is less than 0.1 percent by weight, the film strength after drying tends to become low. If the content is more than 30.0 percent by weight, unfavorably, residual components of the resin remain easily in the film after fusion.

Examples of plasticizers contained in the paste include butylbenzyl phthalate, dioctyl phthalate, diisooctyl phthalate, dicapryl phthalate, and dibutyl phthalate. These plasticizers may be used alone or in combination. The content of the plasticizer contained in the paste is preferably 10.0 percent by weight or less. Addition of the plasticizer may control the drying rate and impart flexibility to a dried film.

Examples of solvent contained in the paste include terpineol, diethylene glycol monobutyl ether acetate, and 2,2,4-trimethyl-1,3-pentadiol monoisobutyrate. The above-described solvents may be used alone or in combination. The content of the solvent contained in the paste is preferably 10.0 percent by weight or more and 90.0 percent by weight or less. If the content is less than 10.0 percent by weight, a uniform film is not obtained easily. If the content is more than 90.0 percent by weight, a uniform film is not obtained easily.

The paste may be produced by kneading the above-described materials at a predetermined ratio.

The glass powder film 4 containing the glass powder 3 may be formed by applying the resulting paste to the base member 1 by a screen printing method and drying and removing the solvent component of the paste. In order to achieve a predetermined film thickness, the paste may be repeatedly applied an appropriate number of times and be dried.

As for the base member 1, any material may be used for the base member in accordance with the purpose. Examples of materials for the base member 1 include quartz glass, quartz, sapphire, and heat-resistant glass. Among them, in particular, quartz glass and quartz can be employed from the viewpoints of oxidizing atmosphere, heat resistance, transparency, and strength. The base member 1 may be a material for low-pass filters and lenses. The base member 1 can contain silicon oxide and have no phase separation property. As for the shape of the base member 1, a base member having any shape may be used insofar as the porous glass film 2 is formed. The shape of the base member 1 may have a curvature.

Step of Fusing Glass Powder

Figure 4B:
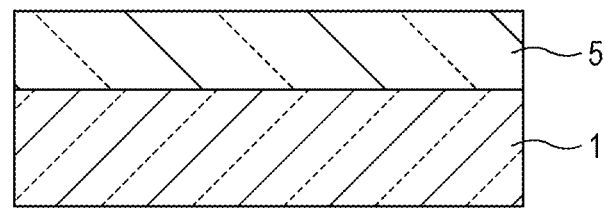
FIG. 4B is a schematic sectional view illustrating an example of a method for manufacturing an optical member according to an aspect of the present invention.

As shown in FIG. 4B, particles of the glass powder 3 in the glass powder film 4 are fused with each other and, thereby, a phase-separable base material glass film 5 is formed on the base member 1.

In this fusing step, vaporization of boron and sodium is suppressed by heating in an atmosphere having an oxygen content higher than the oxygen content in air, that is, in an atmosphere having an oxygen content of more than 20%. Therefore, changes in composition are reduced. The mechanism of vaporization of boron and sodium is not certain, so that oxygen's role in the suppression of vaporization is not clear, although the following are possible explanations. Boron and sodium are volatile components and are ionized easily, so as to be adsorbed by water vapor polarized in the molecule and vaporize. In the case where the oxygen content is larger than that in air, the amount of substances which facilitate vaporization of the water vapor and the like is reduced and, thereby, vaporization is suppressed. In addition, the above-described adsorption of water vapor is facilitated because the heating temperature during fusion is high. Carbon in organic materials contained in the above-described paste remains around the glass powder 3 while adhering thereto hinders fusion and cause an increase in heating temperature. An increase in oxygen concentration facilitates the reaction between oxygen and residual carbon, and fusion proceeds even when the heating temperature is relatively low. Therefore, the reaction of boron and sodium with water vapor, that is, vaporization of boron and sodium is suppressed. As a result, changes in the composition of the glass powder 3 are suppressed, and an increase in fusion temperature due to changes in composition is suppressed.

Consequently, in the case where heating is performed in an atmosphere having an oxygen concentration of more than 20%, fusion is facilitated at relatively low temperatures, and gaps, which cause bubbles, in the glass powder 3 are filled even in the case of low temperature heating, so that the base material glass film 5 including reduced bubbles is obtained. As bubbles in the base material glass film 5 are reduced, the number of bubbles in the porous glass film 2 formed later is reduced, scattering due to bubbles is reduced, and an optical member having an improved transmittance is obtained.

The "bubble" is different from the hole in the porous glass and is an air space which is surrounded by a closed curved line and which is substantially in the shape of a sphere having a diameter of 1 micrometer or more and 5 micrometers or less. The diameter is large and scattering occurs because of bubbles. Therefore, in order to utilize the porous glass as an optical member, it is desired that bubbles are reduced.

Bubbles in the film are evaluated by using an optical microscope. The film is observed at a magnification of 1,000×, and the value obtained by subtracting the area of bubbles from the whole area is taken as a transmission area of the film. That is, the film quality is evaluated by determining the proportion of the area, in which the light does not pass bubbles, relative to the whole film. An example of the analyzing method is as described below. The observed image is stored as an image, and a light portion (transmission portion) and a dark potion (bubble portion) of the optical microscope image are binarized into white and black by using image analysis software. The number of bits of the dark portion is assumed to be an area of bubbles and is subtracted from the number of bits of of the whole portion, so as to calculate the transmission area, and the transmission area ratio is calculated by dividing the transmission area by the area of the whole.

Figure 5:
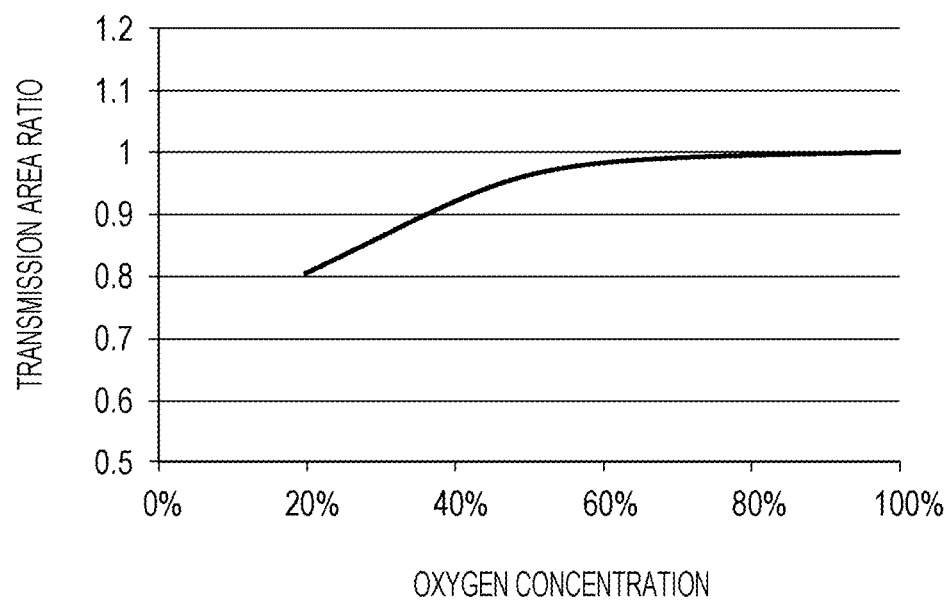
FIG. 5 is a diagram showing the relationship between the oxygen concentration in fusion and the transmission area ratio.

FIG. 5 shows the relationship between the oxygen concentration in fusion and the transmission area ratio of the base material glass film. As is clear from FIG. 5, in the case where the oxygen concentration is higher than 20% (equivalent to that in air), the transmission area ratio is high. In FIG. 5, in the case where the oxygen concentration is 50% or more, the transmission area ratio is an especially high 0.95 or more. Therefore, it is desirable that the oxygen concentration in the fusing step be 50% or more.

Meanwhile, as the temperature in fusion is high, the viscosity of the glass is reduced, so that a flat film is produced easily and scattering at the surface of the film is reduced. However, if the temperature in the fusion is higher than or equal to the crystallization temperature of the glass powder 3, the phase-separable base material glass film 5 is crystallized, and scattering occurs because of the resulting crystals, so as to cause reduction in transmittance. In the present invention, this fusing step is performed through heating at a temperature higher than or equal to the glass transition temperature and lower than and equal to the crystallization temperature, so that the base material glass film 5 is formed by fusing the glass powder 3 without crystallization. Specifically, heating is performed at a temperature preferably of 500 degrees (celsius) or higher and 800 degrees (celsius) or lower.

Examples of heating methods in fusion include resistance heating and infrared lamp heating. In particular, infrared lamp heating is favorably employed, and in the case where a setter composed of SiC, Si, or the like is disposed under the base member 1, heat is added from the base member 1, and a debubbling effect is obtained to a greater degree, so that a film having good film quality is formed.

Step of Forming Phase-Separated Glass Film

Figure 4C:
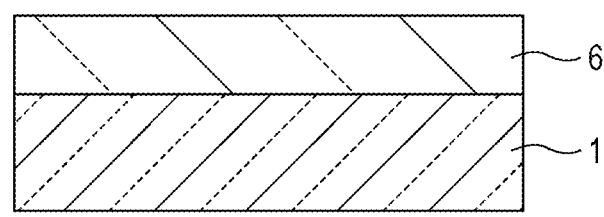
FIG. 4C is a schematic sectional view illustrating an example of a method for manufacturing an optical member according to an aspect of the present invention.

As shown in FIG. 4C, the base material glass film 5 formed on the base member 1 is heated, so as to form a phase-separated glass film 6. Here, the phase-separated glass film 6 refers to a glass film phase-separated into a silicon oxide rich phase and a non-silicon oxide rich phase.

The phase separation heat treatment is performed by maintaining a temperature of 500 degrees (celsius) or higher and 700 degrees (celsius) or lower for 1 hour to 100 hours. The temperature and the time may be set appropriately in accordance with the hole diameter and the like of the porous glass film to be obtained. The heat treatment temperature is not necessarily a constant temperature and the temperature may be changed continuously or stepwise.

Step of Forming Porous Glass Film

Figure 4D:
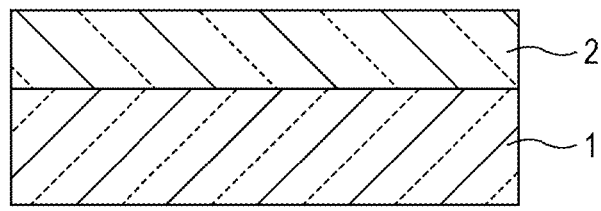
FIG. 4D is a schematic sectional view illustrating an example of a method for manufacturing an optical member according to an aspect of the present invention.

As shown in FIG. 4D, the phase-separated glass film 6 formed on the base member 1 is subjected to an etching treatment and, thereby, the porous glass film 2 having continuous holes is formed on the base member 1. The non-silicon oxide rich phase of the phase-separated glass film 6 is removed by the etching treatment while the silicon oxide rich phase remains. The remaining portion serves as a skeleton of the porous glass film 2 and the portion from which the non-silicon oxide rich phase has been removed serves as a hole of the porous glass film 2.

In general, the etching treatment to remove the non-silicon oxide rich phase is a treatment to elute the non-silicon oxide rich phase, which is a soluble phase, through contact with an aqueous solution. In general, the method for bringing the aqueous solution into contact with the glass is a method in which the glass is immersed in the aqueous solution, although not specifically limited insofar as the glass is brought into contact with the aqueous solution in the method. For example, the glass may be coated with the aqueous solution. As for the aqueous solution required for the etching treatment, known solutions, e.g., water, acid solutions, and alkaline solutions, capable of dissolving the non-silicon oxide rich phase may be used. A plurality of types of step to bring the glass into contact with these aqueous solutions may be selected in accordance with uses.

In the etching treatment of common phase-separated glass, an acid treatment is used favorably from the viewpoints of a small load on an insoluble phase (silicon oxide rich phase) and the degree of selective etching. The non-silicon oxide rich phase, which is an acid-soluble component, is removed through elution because of contact with an acid solution, while corrosion of the silicon oxide rich phase is relatively small, so that high selective etchability is ensured.

Examples of acid solutions can include inorganic acids, e.g., hydrochloric acid and nitric acid. As for the acid solution, usually, an aqueous solution by using water as a solvent can be employed. Usually, the concentration of the acid solution may be specified to be within the range of 0.1 to 2.0 mol/L appropriately. In the acid treatment step, the temperature of the acid solution may be specified to be within the range of room temperature to 100 degrees (celsius) and the treatment time may be specified to be about 1 to 500 hours.

Several hundred nanometers of silicon oxide layer, which hinders etching, may be generated on the glass surface after the phase separation heat treatment depending on the glass composition. This surface layer may be removed by polishing, an alkali treatment, or the like.

Gel silicon oxide may deposit on the skeleton depending on the glass composition. If necessary, a multistage etching method using acid etching solutions having different acidities or water may be employed. Etching may be performed at etching temperatures of room temperature to 95 degrees (celsius). Ultrasonic waves may be applied during the etching treatment, if necessary.

In general, a water treatment (Etching step 2) can be performed after a treatment with an acid solution, an alkaline solution, or the like (Etching step 1) is performed. In the case where the water treatment is performed, adhesion of residual components to a porous glass skeleton is suppressed and a porous glass film having a higher porosity tends to be obtained.

In general, the temperature in the water treatment step is preferably within the range of room temperature to 100 degrees (celsius). The duration of the water treatment step is specified appropriately in accordance with the composition, the size, and the like of the glass concerned and may be usually about 1 hour to 50 hours.

EXAMPLES

The present invention will be described below with reference to the examples. However, the present invention is not limited to the examples.

Base Member A

A quartz base member (produced by IIYAMA PRECISION GLASS CO., LTD., softening point 1,700 degrees (celsius), Young's modulus 72 GPa) was used as a base member A. The base member A having a thickness of 0.5 mm was used after being cut into the size of 50 mm×50 mm and being subjected to mirror finishing.

Production Example of Glass Powder A

A mixed powder of a silicon oxide powder, boron oxide, sodium carbonate, and aluminum oxide was fused in a platinum crucible at 1,500 degrees (celsius) for 24 hours, where the charge composition was specified to be 64 percent by weight of $SiO_2$, 27 percent by weight of $B_2O_3$, 6 percent by weight of $Na_2O$, and 3 percent by weight of $Al_2O_3$. The fused raw material was poured into a graphite mold after the temperature was lowered to 1,300 degrees (celsius). Standing to cool was performed in air for about 20 minutes, keeping was performed in a slow cooling furnace at 500 degrees (celsius) for 5 hours, and finally, cooling was performed for 24 hours, so as to obtain borosilicate glass. The resulting block of the borosilicate glass was pulverized by using a jet mill until the average particle diameter became 4.5 micrometers, so as to obtain the glass powder A. The crystallization temperature of the glass powder A was 800 degrees (celsius).

Production Example of Glass Paste A

Glass powder A: 60 parts by mass
Alpha-terpineol: 44 parts by mass
Ethyl cellulose (trademark ETHOCEL Std 200 (produced by Dow Chemical Company)): 2 parts by mass The above-described raw materials were agitated and mixed, so as to obtain a glass paste A. The viscosity of the glass paste A was 31,300 mPas.

Production Example of Glass Powder Film A

The glass paste A was applied to the base member A through screen printing. A printing machine employed was MT-320TV produced by Micro-tec Co., Ltd. A plate 30 mm×30 mm of #500 was used. The solvent was dried by standing in a drying furnace at 100 degrees (celsius) for 10 minutes, so as to form a glass powder film A.

Example 1

Figure 6:
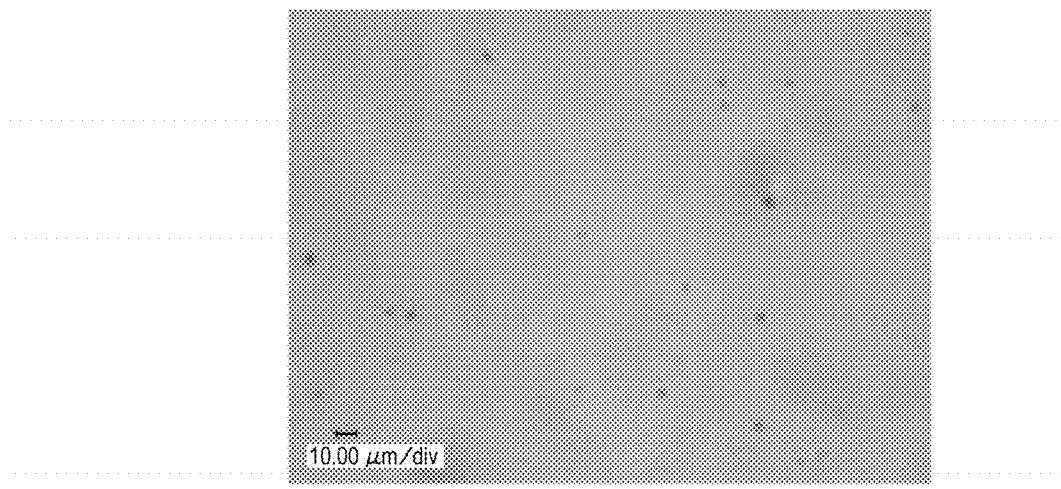
FIG. 6 is an optical micrograph of a phase-separable base material glass film fused in an atmosphere having an oxygen concentration of 100%.

In the fusing step, an infrared lamp furnace was used. In order that the atmosphere in the infrared lamp furnace had an oxygen concentration of 100%, oxygen flowing was performed for 10 minutes. Thereafter, the fusing step of the glass powder film A was performed while the oxygen flowing was continued. In this step, the glass powder film A was heated up to 700 degrees (celsius) at a temperature increasing rate of 10 degrees (celsius)/min and was kept at 700 degrees (celsius) for 1 hour. In infrared lamp heating, QHC-P610CP produced by ULVAC-RIKO was used. Subsequently, heating was stopped and quenching was performed, so as to form a phase-separable base material glass film on the base member A. FIG. 6 shows an optical micrograph of the base material glass film. Almost no bubble was observed and nearly 100% of transmission area was exhibited. The transmittance of the film was measured. An automatic absolute reflectance measuring apparatus ARM-500V/500N Type produced by JASCO Corporation was used for measuring the transmittance. As a result, the transmittance was about 92% at a wavelength of 550 nm. The transmittance of the base member A alone was 93% and, therefore, it is clear that the base material glass film equivalent to the base member A was formed.

The resulting base material glass film was subjected to a heat treatment at 600 degrees (celsius) for 50 hours, so that phase separation was induced. After cooling, the surface of the phase-separated film was polished, so as to form a phase-separated glass film.

The phase-separated glass film was immersed in a 1.0 mol/L nitric acid aqueous solution heated to 80 degrees (celsius) and was stood for 24 hours while being kept at 80 degrees (celsius). Then the phase-separated glass film was immersed in distilled water heated to 80 degrees (celsius) and was stood for 24 hours. The glass body was taken from the solution and was dried for 12 hours, so as to obtain Sample 1.

Figure 7A:
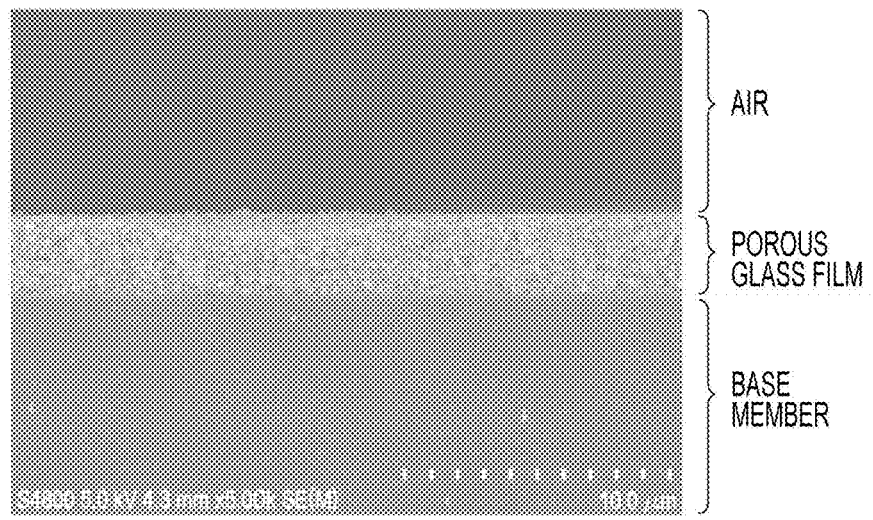
FIG. 7A is an electron micrograph of a cross-section of Sample 1 produced in Example 1.
Figure 7B:
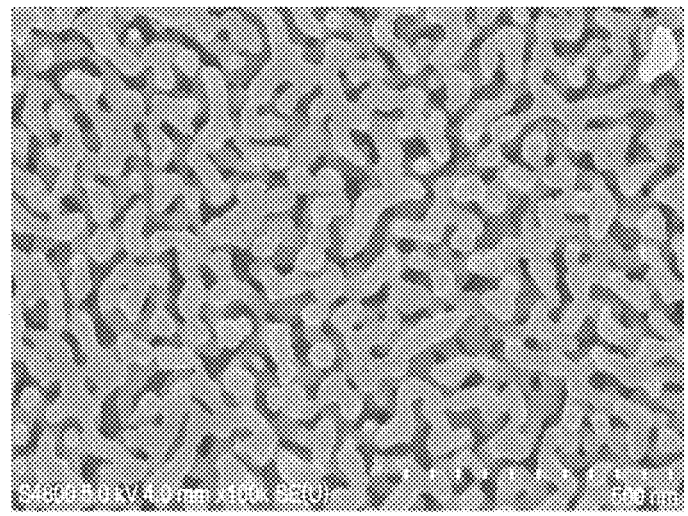
FIG. 7B is an electron micrograph of a cross-section of Sample 1 produced in Example 1.

FIG. 7A is an electron micrograph of a cross-section of Sample 1 observed at the magnification of 5,000×. It is clear that the porous glass film is formed all over a 3-micrometer film on the base member A. FIG. 7B is an electron micrograph observed at the magnification of 100,000×. Continuous holes having the spinodal structure are observed. The porosity determined by using this drawing was 52%.

Example 2

In the present example, the oxygen concentration in the infrared lamp furnace was changed from that in Example 1. In the present example, the gas flow was adjusted in such a way that oxygen:nitrogen=4:1 was satisfied, that is, the oxygen concentration became 80%. Sample 2 was produced under the same condition and process as those in Example 1 except the above-described condition.

Example 3

In the present example, the oxygen concentration in the infrared lamp furnace was changed from that in Example 1. In the present example, the gas flow was adjusted in such a way that oxygen:nitrogen=1:1 was satisfied, that is, the oxygen concentration became 50%. Sample 3 was produced under the same condition and process as those in Example 1 except the above-described condition.

Comparative Example 1

In the present comparative example, the oxygen concentration in the infrared lamp furnace was changed from that in Example 1. In the present comparative example, the gas flow was adjusted in such a way that oxygen:nitrogen=1:4 was satisfied, that is, the oxygen concentration became 20%. Sample 4 was produced under the same condition and process as those in Example 1 except the above-described condition.

Figure 8:
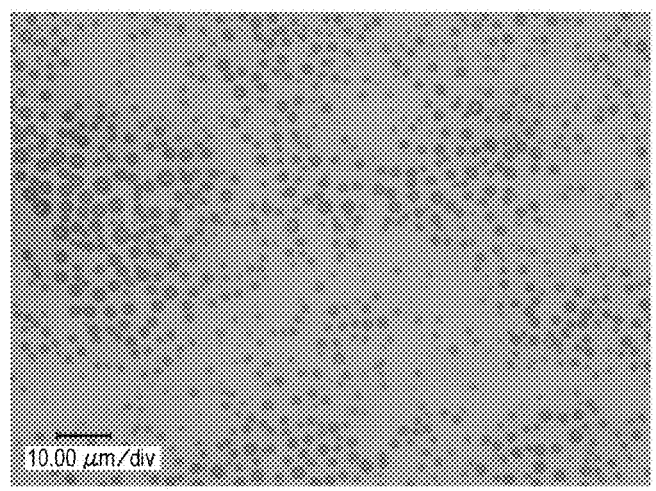
FIG. 8 is an electron micrograph of a phase-separable base material glass film fused in an atmosphere having an oxygen concentration of 20%.

FIG. 8 is an electron micrograph of a phase-separable base material glass film formed on the base member A. Bubbles were present in the base material glass film and the transmission area of 80% was exhibited.

Film Evaluation

FIG. 5 is a graph collectively showing the transmission area ratios determined from the optical micrographs of Samples 1 to 4. The horizontal axis indicates the oxygen concentration and the vertical axis indicates the transmission area ratio. As the oxygen concentration increases, the transmission area ratio tends to increase. An inflection point is observed in the vicinity of the oxygen concentration of 50%, and when the oxygen concentration is 50% or more, the transmission area ratio becomes 95% or more. It is possible to reduce bubbles present in the film by controlling the oxygen concentration in the fusing step.

Transmittance Evaluation

Figure 9:
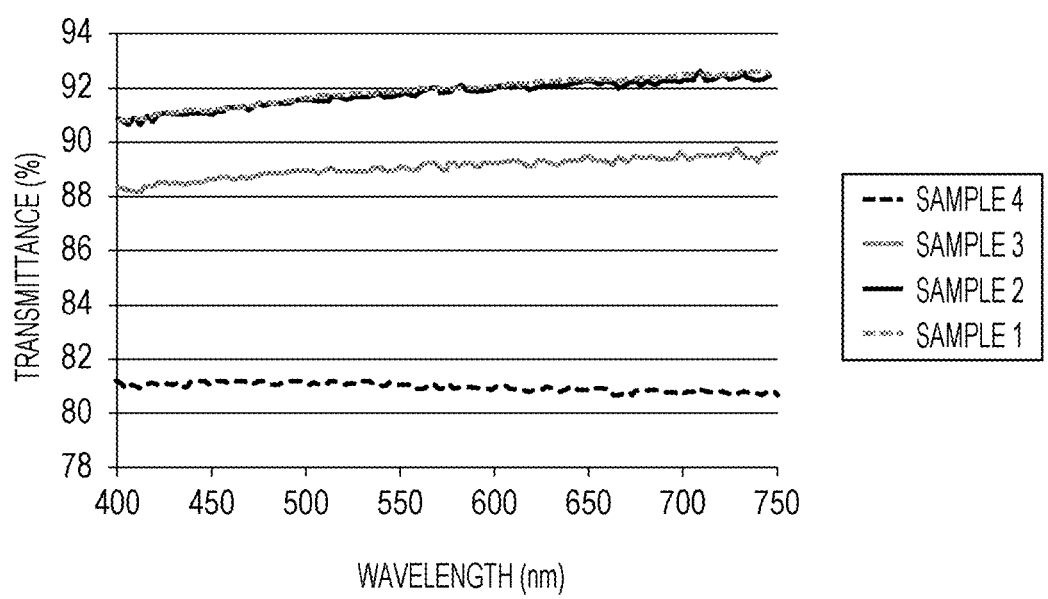
FIG. 9 is a diagram showing the wavelength dependence of transmittance of Samples 1 to 4.

The transmittance of each of Samples 1 to 4 was measured at every 1 nm in the range of 400 to 7,500 nm by using an automatic optical element measuring apparatus (V-570, produced by JASCO Corporation). The incident angle of the light in the transmittance measurement was specified to be 0 degrees. FIG. 9 shows the results of the transmittance.

Samples 1 to 3 exhibited transmittance higher than the transmittance of Sample 4 in the wavelength range of 400 to 750 nm. In particular, Samples 2 and 3 had high transmittance of 90% or more throughout the above-described wavelength range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-253069, filed Nov. 18, 2011, which is hereby incorporated by reference herein in its entirety.

REFERENCE SIGNS LIST

1 Base member
2 Porous glass film
3 Glass powder
4 Glass powder film
5 Base material glass film
6 Phase-separated glass film

The invention claimed is:

1. A method for manufacturing an optical member provided with a porous glass film on a base member, comprising the steps of:
   forming a glass powder film containing a glass powder on the base member;
   forming a phase-separable base material glass film on the base member by heating and fusing the glass powder film;
   forming a phase-separated glass film on the base member by heating the base material glass film; and
   forming a porous glass film on the base member by subjecting the phase-separated glass film to an etching treatment,
   wherein the glass powder comprises $SiO_2$, $B_2O_3$, $Na_2O$ and $Al_2O_3$, and
   wherein the step of forming a phase-separable base material glass film on the base member by heating and fusing the glass powder film is performed in an atmosphere having an oxygen concentration of 50% or more.

2. The method for manufacturing an optical member, according to claim 1, wherein the forming of the base material glass film is performed by heating at a temperature higher than or equal to the glass transition temperature and lower than or equal to the crystallization temperature.

3. The method for manufacturing an optical member, according to claim 1, wherein the forming of the base material glass film is performed by heating at a temperature from 500 degrees (Celsius) to 800 degrees (Celsius).

* * * * *